United States Patent
Bilinski et al.

(10) Patent No.: US 9,171,095 B1
(45) Date of Patent: Oct. 27, 2015

(54) TRACK SHARING

(71) Applicant: Google Inc., Mountain View, CA (US)

(72) Inventors: Brandon Bilinski, San Francisco, CA (US); Owen Daniel Otto, Oakland, CA (US)

(73) Assignee: GOOGLE INC., Mountain View, CA (US)

( * ) Notice: Subject to any disclaimer, the term of this patent is extended or adjusted under 35 U.S.C. 154(b) by 319 days.

(21) Appl. No.: 13/650,817

(22) Filed: Oct. 12, 2012

(51) Int. Cl.
*G06F 17/00* (2006.01)
*G06F 17/30* (2006.01)
*H04L 12/58* (2006.01)

(52) U.S. Cl.
CPC ............ *G06F 17/3089* (2013.01); *H04L 51/32* (2013.01)

(58) Field of Classification Search
CPC ..... H04L 51/10; H04L 51/32; H04L 12/5845; H04L 12/588; G06F 17/3089
USPC .............................................. 700/94; 707/758
See application file for complete search history.

(56) References Cited

U.S. PATENT DOCUMENTS

| | | | |
|---|---|---|---|
| 2008/0140644 A1* | 6/2008 | Franks et al. | 707/5 |
| 2008/0222199 A1* | 9/2008 | Tiu et al. | 707/104.1 |
| 2012/0102124 A1* | 4/2012 | Hansson et al. | 709/206 |

* cited by examiner

*Primary Examiner* — Andrew C Flanders
(74) *Attorney, Agent, or Firm* — Morris & Kamlay LLP

(57) ABSTRACT

A computer-implemented method, computer program product, and computing system for receiving, from a user, an intent to share a music track defined within a music consumption system. A query that identifies the music track is generated on a computing device. The query is provided to a video distribution system, wherein the video distribution system is configured to receive and process the query. A result set is received from the video distribution system. If the result set defines one of more videos, available via the video distribution system, that are related to the music track that the user intends to share, a post from the user is generated, on a social networking site, that includes at least one link locating at least one video selected from the one or more videos defined within the result set.

18 Claims, 5 Drawing Sheets

10

TRACK SHARING

TECHNICAL FIELD

This disclosure relates to media tracks and, more particularly, to the sharing of media tracks.

BACKGROUND

The Internet currently allows for the free exchange of ideas and information in a manner that was unimaginable only a couple of decades ago. One such use for the Internet is as a communication medium, whether it is via one-on-one exchanges or multi-party exchanges. For example, two individuals may exchange private emails with each other. Alternatively, multiple people may participate on a public website in which they may post entries that are published for multiple people to read. Examples of such websites may include but are not limited to product/service review sites, social networks, and topical blogs.

Users of a media consumption system may purchase media files for personal use. Examples of such media files may include but are not limited to music files and video files. When such media files are obtained (and depending upon the media consumption system utilized), the user may wish to "share" the purchased media file with various people to whom the purchaser is connected within a social network (e.g., via a media sharing post to their media stream). Unfortunately, the sharing of such media files may violate various laws, such as the DMCA (i.e., Digital Millennium Copyright Act).

SUMMARY OF DISCLOSURE

In a first implementation, a computer-implemented method includes receiving, from a user, an intent to share a music track defined within a music consumption system. A query that identifies the music track is generated on a computing device. The query is provided to a video distribution system, wherein the video distribution system is configured to receive and process the query. A result set is received from the video distribution system. If the result set defines one or more videos, available via the video distribution system, that are related to the music track that the user intends to share, a post from the user is generated, on a social networking site, that includes at least one link locating at least one video selected from the one or more videos defined within the result set.

One or more of the following features may be included. The at least one video may be automatically selected from the one or more videos defined within the result set. Generating a query that identifies the music track may include generating a query that identifies one or more of: a track artist, an album artist, and a track title. Providing the query to a video distribution system may include providing the query to an applications programming interface of the video distribution system. The post from the user may further include rich metadata associated with the music track defined within the music consumption system. The result set from the video distribution system may define metadata for each of the one of more videos defined within the result set. The user may be prompted to share a different music track if the result set received from the video distribution system defines zero videos.

In another implementation, a computer program product resides on a computer readable medium and has a plurality of instructions stored on it. When executed by a processor, the instructions cause the processor to perform operations including receiving, from a user, an intent to share a music track defined within a music consumption system. A query that identifies the music track is generated on a computing device. The query is provided to a video distribution system, wherein the video distribution system is configured to receive and process the query. A result set is received from the video distribution system. If the result set defines one or more videos, available via the video distribution system, that are related to the music track that the user intends to share, a post from the user is generated, on a social networking site, that includes at least one link locating at least one video selected from the one or more videos defined within the result set.

One or more of the following features may be included. The at least one video may be automatically selected from the one or more videos defined within the result set. Generating a query that identifies the music track may include generating a query that identifies one or more of: a track artist, an album artist, and a track title. Providing the query to a video distribution system may include providing the query to an applications programming interface of the video distribution system. The post from the user may further include rich metadata associated with the music track defined within the music consumption system. The result set from the video distribution system may define metadata for each of the one of more videos defined within the result set. The user may be prompted to share a different music track if the result set received from the video distribution system defines zero videos.

In another implementation, a computing system includes a processor and a memory system configured to perform operations including receiving, from a user, an intent to share a music track defined within a music consumption system. A query that identifies the music track is generated on a computing device. The query is provided to a video distribution system, wherein the video distribution system is configured to receive and process the query. A result set is received from the video distribution system. If the result set defines one of more videos, available via the video distribution system, that are related to the music track that the user intends to share, a post from the user is generated, on a social networking site, that includes at least one link locating at least one video selected from the one or more videos defined within the result set.

One or more of the following features may be included. The at least one video may be automatically selected from the one or more videos defined within the result set. Generating a query that identifies the music track may include generating a query that identifies one or more of: a track artist, an album artist, and a track title. Providing the query to a video distribution system may include providing the query to an applications programming interface of the video distribution system. The post from the user may further include rich metadata associated with the music track defined within the music consumption system. The result set from the video distribution system may define metadata for each of the one of more videos defined within the result set. The user may be prompted to share a different music track if the result set received from the video distribution system defines zero videos.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview

Figure 1:
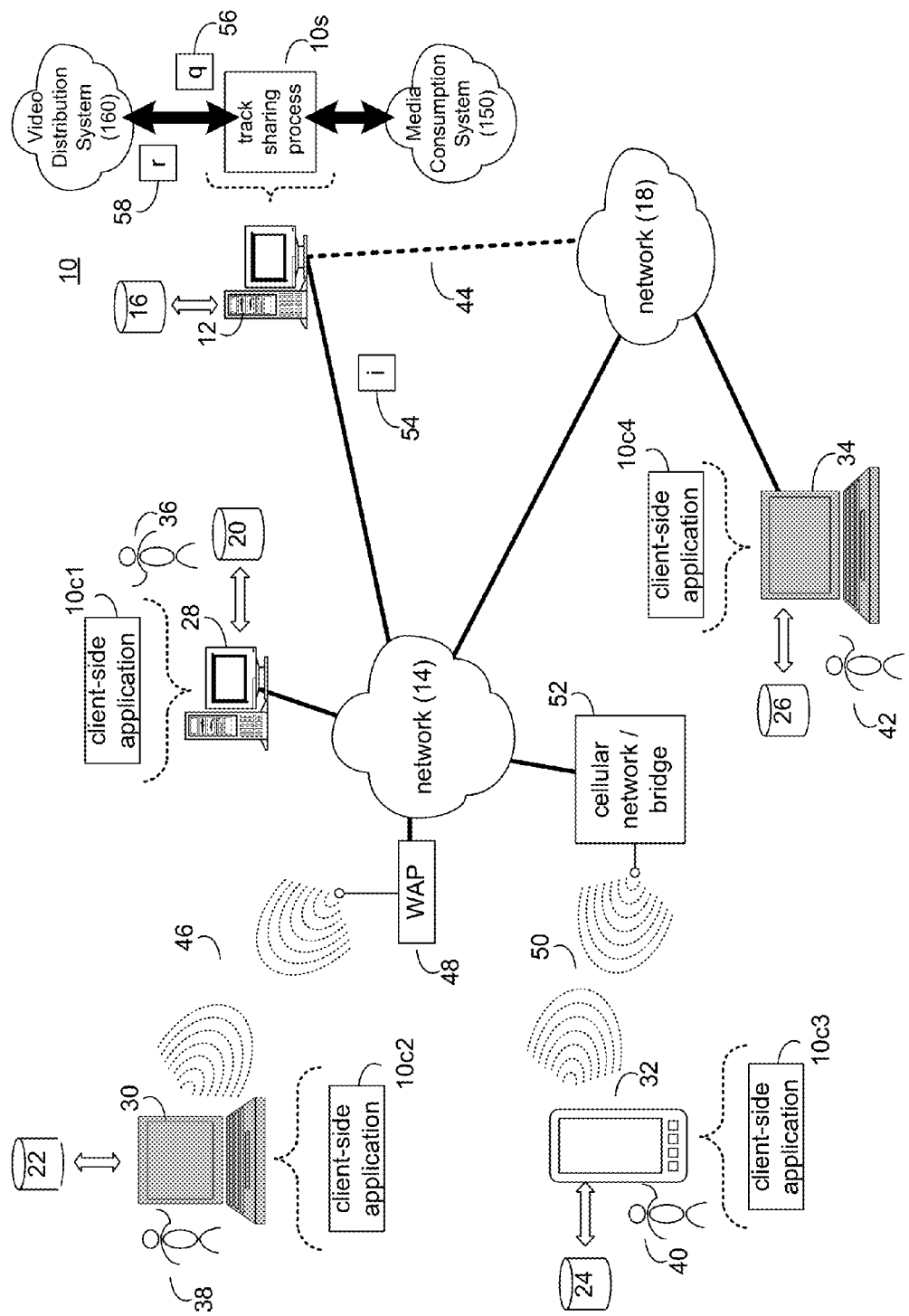
FIG. 1 is a diagrammatic view of a distributed computing network including a computing device that executes a track sharing process.

Referring to FIG. 1, there is shown track sharing process 10. For the following discussion, it is intended to be understood that track sharing process 10 may be implemented in a variety of ways. For example, track sharing process 10 may be implemented as a server-side process, a client-side process, or a server-side/client-side process.

For example, track sharing process 10 may be implemented as a purely server-side process via track sharing process 10s. Alternatively, track sharing process 10 may be implemented as a purely client-side process via one or more of client-side application 10c1, client-side application 10c2, client-side application 10c3, and client-side application 10c4. Alternatively still, track sharing process 10 may be implemented as a server-side/client-side process via track sharing process 10s in combination with one or more of client-side application 10c1, client-side application 10c2, client-side application 10c3, and client-side application 10c4.

Accordingly, track sharing process 10 as used in this disclosure may include any combination of track sharing process 10s, client-side application 10c1, client-side application 10c2, client-side application 10c3, and client-side application 10c4.

Figure 2:
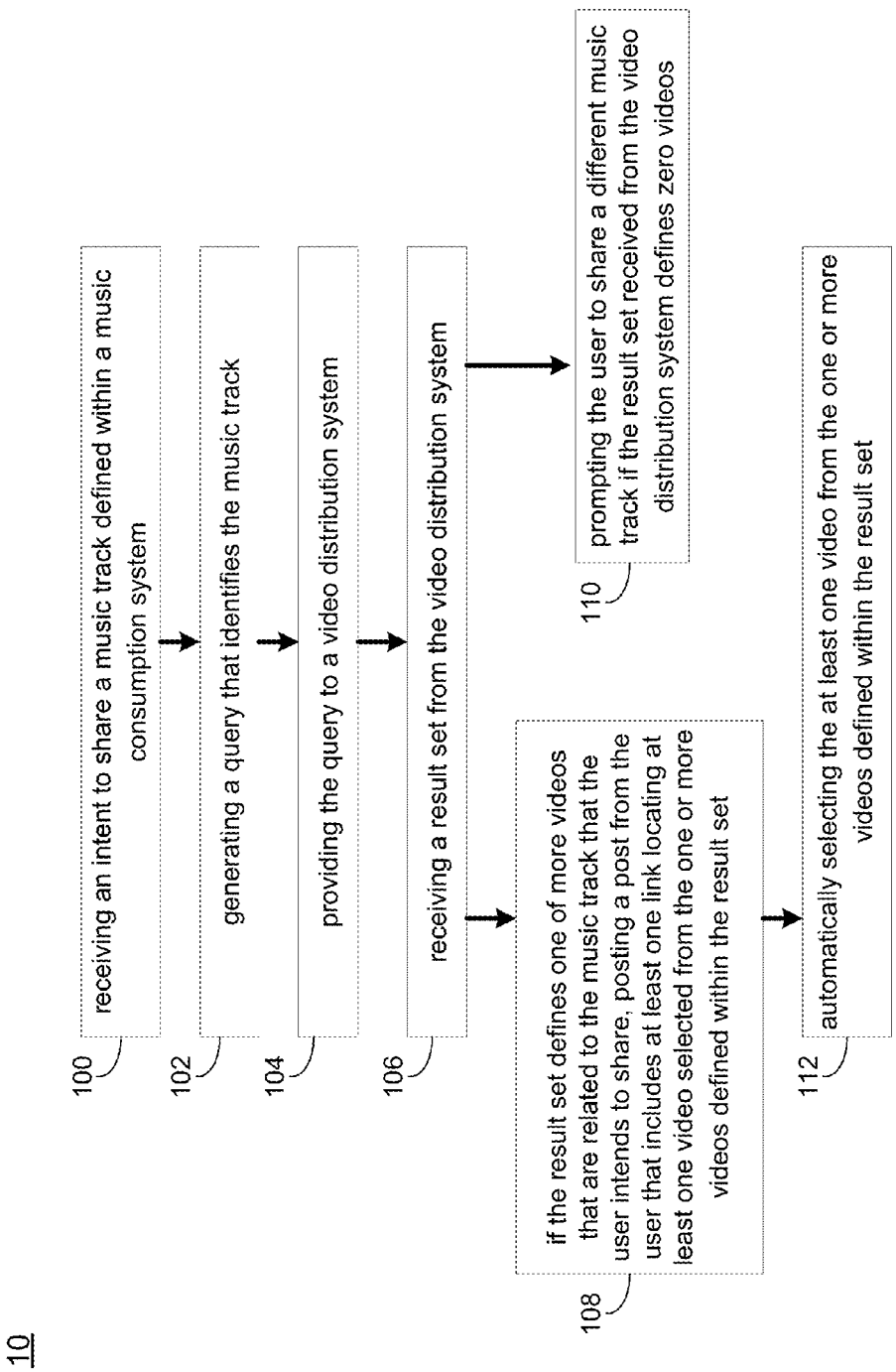
FIG. 2 is a flowchart of the track sharing process of FIG. 1.

Referring also to FIG. 2 and as will be discussed below in greater detail, track sharing process 10 may receive 100, from a user, an intent to share a music track defined within a music consumption system. Track sharing process 10 may generate 102, on a computing device, a query that identifies the music track. Track sharing process 10 may provide 104 the query to a video distribution system, wherein the video distribution system is configured to receive and process the query. Track sharing process 10 may receive 106 a result set from the video distribution system. If the result set defines one or more videos (available via the video distribution system) that are related to the music track that the user intends to share, track sharing process 10 may generate 108 a post from the user (on a social networking site) that includes at least one link locating at least one video selected from the one or more videos defined within the result set.

Track sharing process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of track sharing process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, data-enabled, cellular telephone 32, notebook computer 34, a server computer (not shown), a gaming console (not shown), a data-enabled television console (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access track sharing process 10 directly through network 14 or through secondary network 18. Further, track sharing process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14 via a hardwired network connection. Laptop computer 30 is shown wirelessly coupled to network 14 via wireless communication channel 46 established between laptop computer 30 and wireless access point (i.e., WAP) 48, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Further, data-enabled, cellular telephone 32 is shown wirelessly coupled to network 14 via wireless communication channel 50 established between data-enabled, cellular telephone 32 and cellular network/bridge 52, which is shown directly coupled to network 14. Additionally, notebook computer 34 is shown directly coupled to network 18 via a hardwired network connection.

Figure 3:
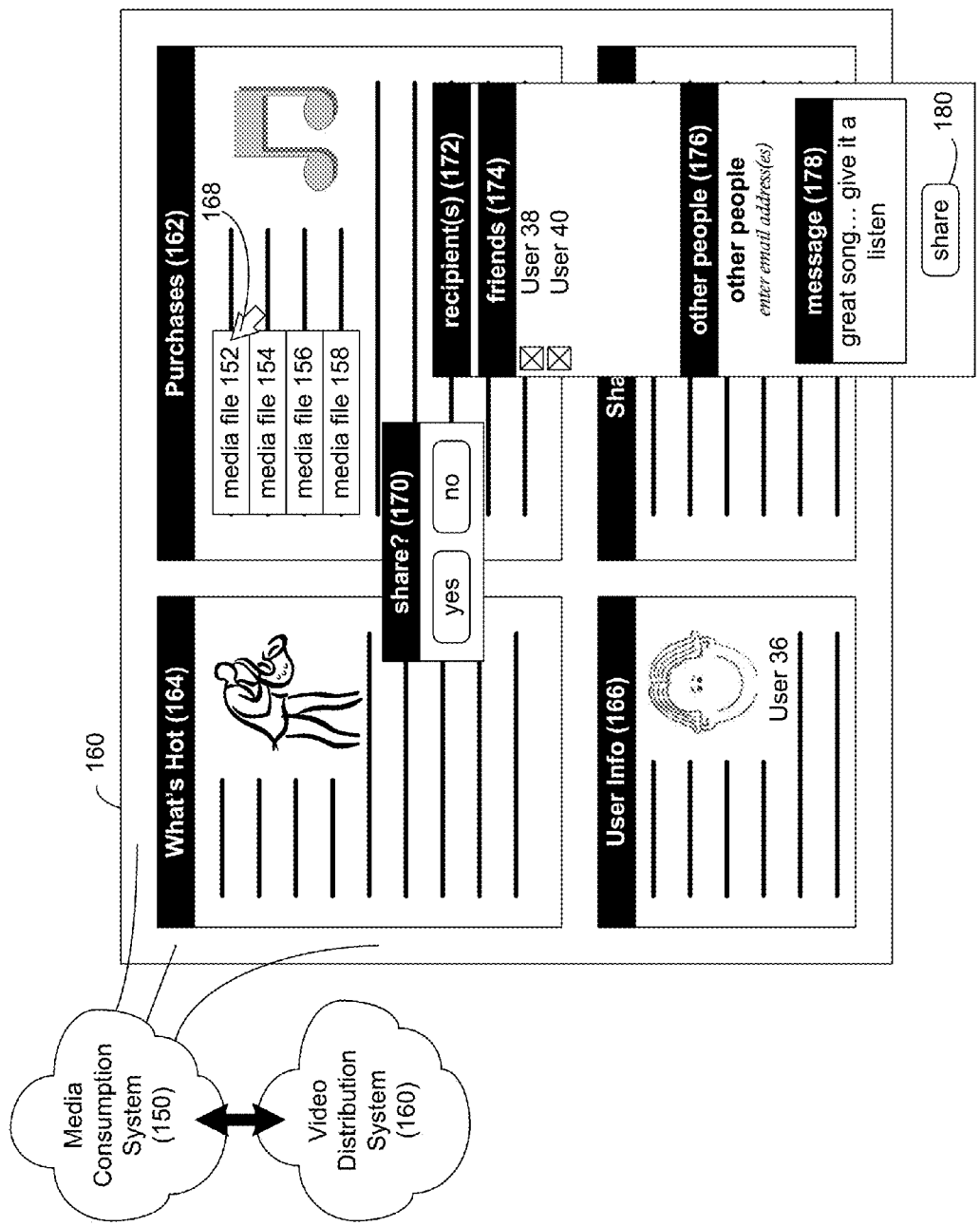
FIG. 3 is a graphical user interface of a media consumption system.
Figure 4:
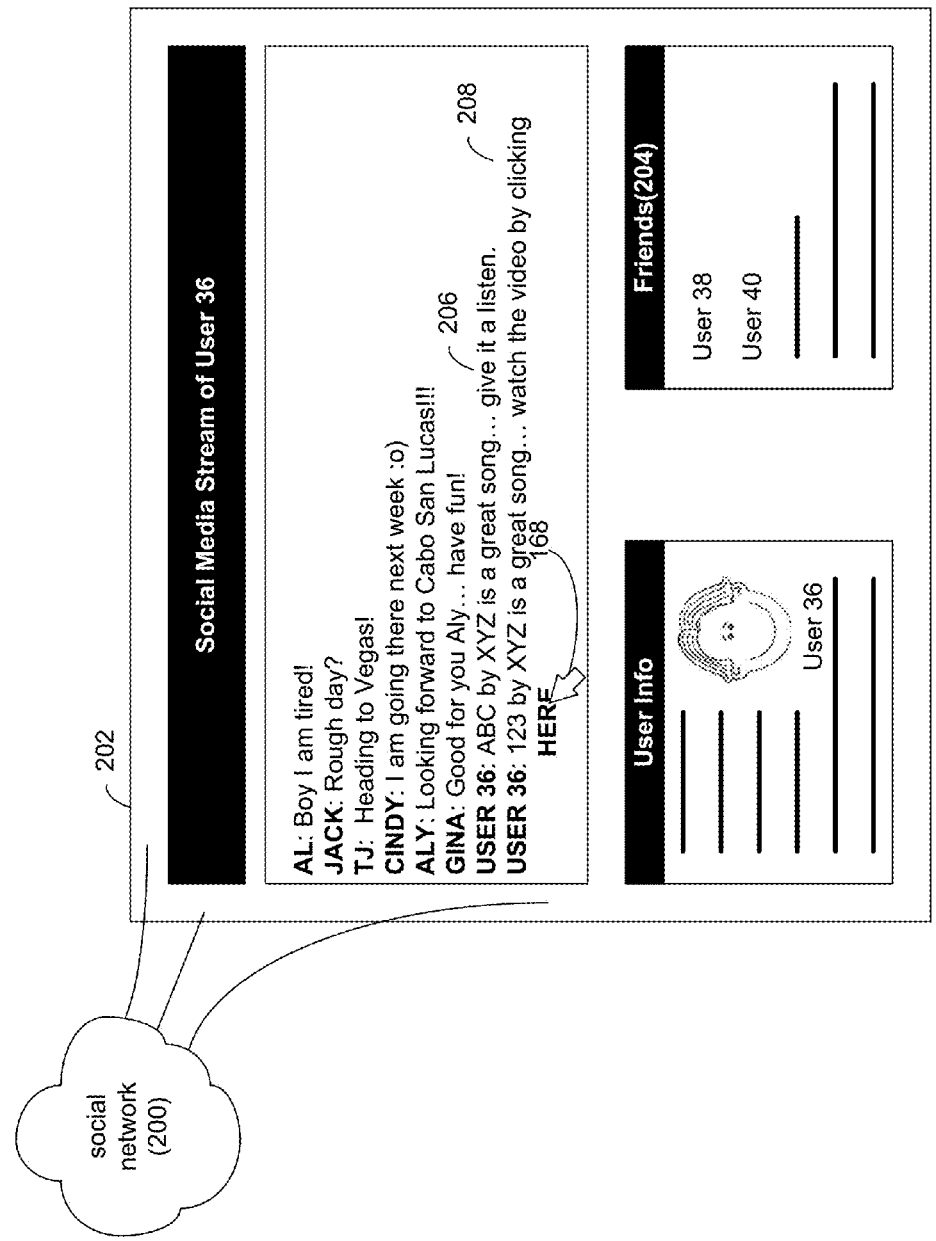
FIG. 4 is a graphical user interface of a social network.

The Track Sharing Process:

Referring also to FIGS. 3-4, a user (e.g. user 36) of a media consumption system (e.g. media consumption system 150) may purchase one or more media files (e.g. media files 152, 154, 156, 158) for personal use. Examples of such media files may include but are not limited to music files (e.g. digitally encoded MP3 audio files) and/or video files (e.g. digitally encoded MOV video files).

As discussed above, when such media files (e.g. media files 152, 154, 156, 158) are obtained (and depending upon the media consumption system utilized), the user may wish to "share" the purchased media file with various people to whom the purchaser is connected within social network 200 (e.g., via a media sharing post to their media stream). Unfortunately, the sharing of such media files may violate various laws, such as the DMCA (i.e., Digital Millennium Copyright Act). However, various video distribution systems (e.g. YouTube™) may allow for the sharing of video-based versions of the purchased media file due to various licensing agreements negotiated by the video-sharing website. Accordingly, while user 36 may be unable to share a purchased music track that they are listening to via media consumption system 150, user 36 may be able to share the corresponding music video (associated with the purchased music track) that is available via video distribution system 160.

For example, assume that user 36 is a member of social network 200, which user 36 accesses via graphical user interface 202. Further, assume that user 36 has several friends (e.g. friends 204) that are arranged within the organizational scheme of social network 200. Assume for illustrative purposes that included within friends 204 of user 36 are users 38, 40.

Continuing with the above-stated example, assume for illustrative purposes that user 36 purchased media files 152, 154, 156, 158 (e.g. music files) and user 36 wishes to share media file 152 with users 38, 40 (who are included within the friends 204 of user 36 within social network 200).

User 36 may have purchased media files 152, 154, 156, 158 from one or more online music services that may effectuate the purchase of such media files. For example, this online music service may be an online sales service offered by/through media consumption system 150. Alternatively, this online music service may be a stand-alone service that is not associated with media consumption system 150. Further, social network 200 may be a social network that is not associated with the above-described online music service and/or music consumption system 150. Accordingly, user 36 may purchase media files 152, 154, 156, 158 from a first website associated with the above-described online music service. Media files 152, 154, 156, 158 may then be processed and rendered (i.e., played) via music consumption system 150 and then shared via a second website that is associated with social network 200. This second website may be different from (and not affiliated with) the first website that is associated with the above-described online music service.

Media consumption system 150 may render a graphical user interface on e.g. a display associated with desktop computer 28. For illustrative purposes, the graphical user interface may include various sections, such as Purchases section 162, What's Hot section 164, and User Info section 166. Within Purchases section 162, a list of media files purchased by (in this example) user 36 may be itemized. In this particular illustrative example of Purchases section 162, four purchases (namely media files 152, 154, 156, 158) are itemized. What's Hot section 164 may: identify popular media files that are available for download by user 36; provide user 36 with various related news articles; and allow user 36 to purchase various related products (e.g. concert tickets). Within User Info section 166, the user of media consumption system 150 (e.g. user 36) may be able to define a profile for himself. For example, user 36 may e.g. define their complete name, e-mail address, physical address, likes/dislikes, favorite actors, favorite musicians, favorite movies, and favorite music.

As discussed above, assume that user 36 wishes to share media file 152 with users 38, 40 (who are included within friends 204 of user 36 within social network 200). Accordingly, user 36 may select (via on-screen pointer 168 that is controllable by a mouse, not shown) the appropriate media file (e.g. media file 152) from e.g. Purchases section 162 for sharing. For example, user 36 may "right-click" above the entry within Purchases section 162 that corresponds to media file 152, resulting in the rendering of sharing menu 170 by track sharing process 10. Sharing menu 170 may be configured to allow user 36 to share (in this example) media file 152. If user 36 selects the "yes" button included within sharing menu 170 (with e.g. on-screen pointer 168), recipient menu 172 may be rendered by track sharing process 10 that allows user 36 to select the people with whom they wish to share media file 152. For example, user 36 may be able to select (with e.g. on-screen pointer 168) users 38, 40.

As discussed above, track sharing process 10 may be included within, executed within, or a portion of media consumption system 150 and/or social network 200. Accordingly, when rendering recipient menu 172, track sharing process 10 may access the appropriate portion of social network 200 so that recipient menu 172 may be populated with some (or all) of the friends 204 of user 36 within social network 200. Therefore, track sharing process 10 may be configured to access one or more databases (not shown) within social network 200.

Recipient menu 172 may have various areas that allow user 36 to select/define the intended recipients. For example, recipient menu 172 may include "friends" section 174, which may itemize one or more of friends 200 of e.g. user 36 within social network 200. Additionally, recipient menu 172 may include "other people" section 176 that may allow user 36 to identify intended recipients that user 36 is not friends with within social network 200. For example, "other people" section 176 may allow user 36 to define one or more e-mail addresses for intended recipients. Further, "message" section 178 may allow user 36 to insert a personal message that may be included within the media sharing post made within the social media streams for users 38, 40. For example, user 36 may define the message "great song . . . give it a listen".

Continuing with the above-stated example in which user 36 wishes to share media file 152 with users 38, 40 (who are included within friends 204 of user 36 within social network 200), once user 36 identifies users 38, 40 as the parties with which they would like to share media file 152, user 36 (e.g. with on-screen pointer 168) may select "share" button 180. Once (in this example), "share" button 180 is selected, track sharing process 10 may receive 100, from user 36, an intent (e.g., intent 54) to share media file 152 defined within music consumption system 150. Upon receiving intent 150, track sharing process 10 may generate 102 a query (e.g., query 56) that identifies media file 152 (e.g., identifies one or more of: a track artist, an album artist, and a track title), wherein query 56 may be provided 104 to video distribution system 160. Assume for illustrative purposes that video distribution system 160 is configured to receive and process query 56.

When providing 104 query 56 to video distribution system 160, track sharing process 10 may provide query 56 to an applications programming interface (not shown) of video distribution system 160. As is known in the art, an API is a specification configured to allow certain software components/applications to communicate with other software components/applications. Accordingly, an API included within video distribution system 160 may be configured to allow other software applications (e.g., track sharing process 10) to communicate with (e.g., provide queries to) video distribution system 160.

Once video distribution system 160 receives and processes query 56, video distribution system 160 may generate a result set (e.g., result set 58) that may be provided to track sharing process 10. Upon receiving 106 result set 58 from video distribution system 160, track sharing process 10 may analyze the same.

If result set 58 (received from video distribution system 160) defines zero videos (e.g., is an empty result set), track sharing process 10 may prompt 110 user 36 to share a different music track (as video distribution system 160 does not have a video available that corresponds to media file 152. Additionally/alternatively, track sharing process 10 may generate 108 a post (e.g., post 206) from user 38 (on social networking site 200) that identifies the track (e.g., media file 152) that user 38 had wanted to share (via a corresponding video) but was unable to do so.

If result set 58 (received from video distribution system 160) defines one of more videos (available via video distribution system 160) that are related to the music track (e.g., media file 152) that user 36 intends to share, track sharing process 10 may generate 108 a post (e.g., post 208) from user 38 (on social networking site 200) that includes at least one link locating at least one video selected from videos defined within result set 58. An example of post 208 is "123 by XYZ is a great song . . . watch the video by clicking HERE", wherein the word "HERE" is an embedded hyperlink that, when clicked on, directs the user to the video (available via video distribution system 160) that corresponds to media file 152.

Result set 58 received from video distribution system 160 may define metadata for each of the videos defined within result set 58. For example, if result set 58 defines six videos that correspond to media file 152, result set 58 may define metadata for each of the videos defined within result set 58. Examples of such metadata may include but are not limited to a track artist, an album artist, a track title, a track release date, an album release date, a record label, a genre and a composer).

Further, when result set 58 includes a plurality of videos, one of the videos (chosen from the plurality of videos included within result set 58) may be automatically selected 112 for inclusion within e.g., post 208. For example, if result set 58 includes six videos, the most highly corresponding video may be automatically selected 112 for inclusion within post 208. Post 208 from user 36 may include rich metadata associated with the music track (e.g., media file 152) defined within music consumption system 150. For example, the rich metadata associated with media file 152 may be more accurate and/or more expansive than the metadata defined for the specific video identified within post 208.

Figure 5:
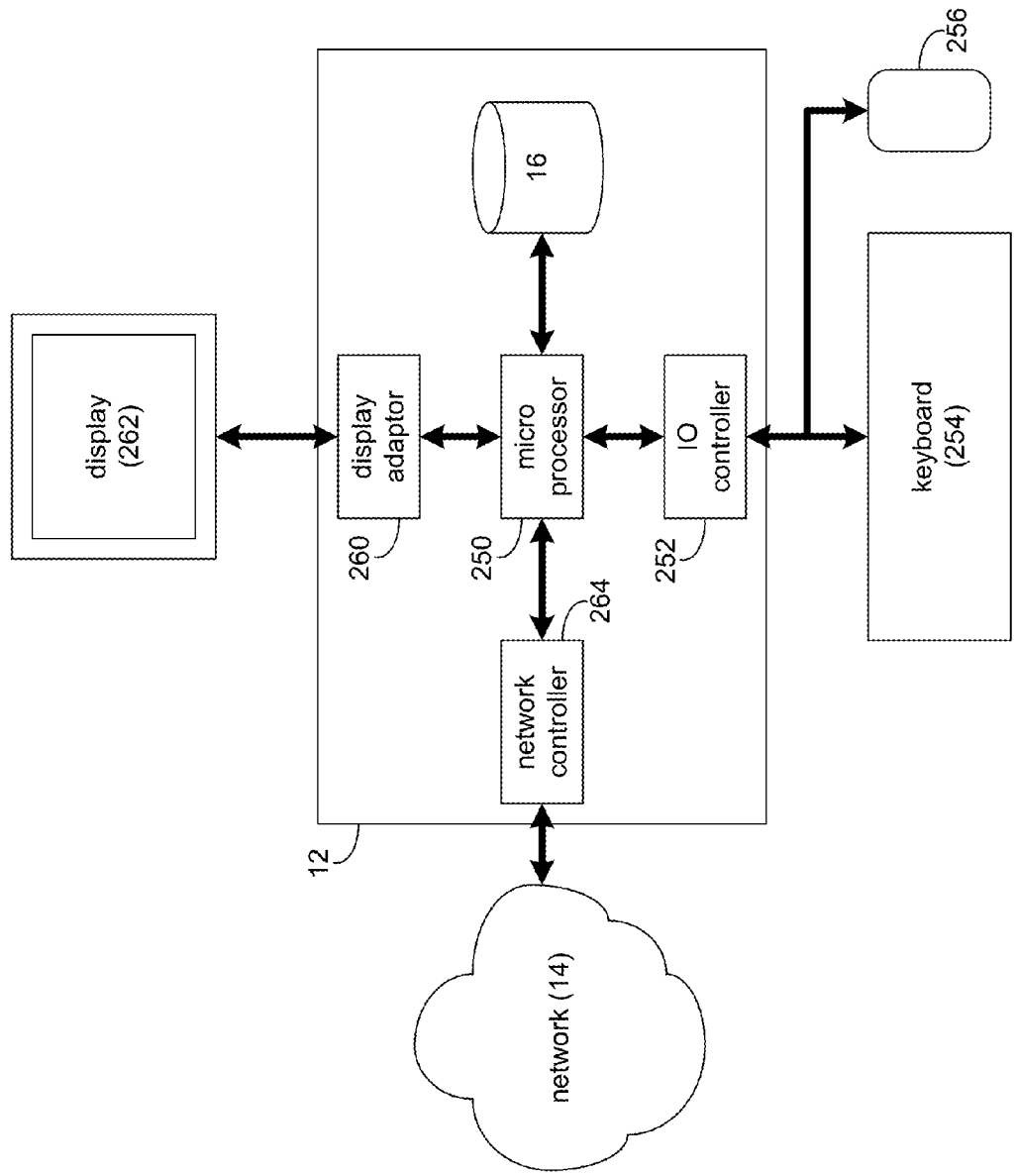
FIG. 5 is a diagrammatic view of the computing device of FIG. 1.

General:

Referring also to FIG. 5, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, track sharing process 10 may be substituted for computing device 12 within FIG. 5, examples of which may include but are not limited to client electronic devices 28, 30, 32, 34.

Computing system 12 may include microprocessor 250 configured to e.g., process data and execute instructions/code for track sharing process 10. Microprocessor 250 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 252 may be configured to couple microprocessor 250 with various devices, such as keyboard 254, mouse 256, USB ports (not shown), and printer ports (not shown). Display adaptor 260 may be configured to couple display 262 (e.g., a CRT or LCD monitor) with microprocessor 250, while network adapter 264 (e.g., an Ethernet adapter) may be configured to couple microprocessor 250 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 250) of a general purpose computer/special purpose computer/other programmable data processing apparatus (e.g., computing device 12), such that the instructions, which execute via the processor (e.g., processor 250) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   receiving, from a user, an intent to share a music track defined within a music consumption system;
   generating, on a computing device, a query that identifies the music track;
   providing the query to a video distribution system, wherein the video distribution system is configured to receive and process the query;
   receiving a result set from the video distribution system;
   when the result set defines one or more videos, available via the video distribution system, that are related to the music track that the user intends to share, generating a post from the user, on a social networking site, that includes at least one link locating at least one video selected from the one or more videos defined within the result set; and
   prompting the user to share a different music track when the result set received from the video distribution system defines zero videos.

2. The computer implemented method of claim 1 further comprising:
   automatically selecting the at least one video from the one or more videos defined within the result set.

3. The computer implemented method of claim 1 wherein generating a query that identifies the music track includes generating a query that identifies one or more of:
   a track artist,
   an album artist, and
   a track title.

4. The computer implemented method of claim 1 wherein providing the query to a video distribution system includes:
   providing the query to an applications programming interface of the video distribution system.

5. The computer implemented method of claim 1 wherein the post from the user further includes rich metadata associated with the music track defined within the music consumption system.

6. The computer implemented method of claim 1 wherein the result set from the video distribution system defines metadata for each of the one or more videos defined within the result set.

7. A computer program product residing on a non-transitory computer readable medium having a plurality of instructions stored thereon which, when executed by a processor, cause the processor to perform operations comprising:
   receiving, from a user, an intent to share a music track defined within a music consumption system;
   generating, on a computing device, a query that identifies the music track; providing the query to a video distribution system, wherein the video distribution system is configured to receive and process the query; receiving a result set from the video distribution system;

when the result set defines one or more videos, available via the video distribution system, that are related to the music track that the user intends to share, generating a post from the user, on a social networking site, that includes at least one link locating at least one video selected from the one or more videos defined within the result set; and prompting the user to share a different music track when the result set received from the video distribution system defines zero videos.

8. The computer program product of claim 7 further comprising instructions for:

automatically selecting the at least one video from the one or more videos defined within the result set.

9. The computer program product of claim 7 wherein the instructions for generating a query that identifies the music track include instructions for generating a query that identifies one or more of:

a track artist,
an album artist, and
a track title.

10. The computer program product of claim 7 wherein the instructions for providing the query to a video distribution system include instructions for:

providing the query to an applications programming interface of the video distribution system.

11. The computer program product of claim 7 wherein the post from the user further includes rich metadata associated with the music track defined within the music consumption system.

12. The computer program product of claim 7 wherein the result set from the video distribution system defines metadata for each of the one or more videos defined within the result set.

13. A computing system including a processor and memory configured to perform operations comprising:

receiving, from a user, an intent to share a music track defined within a music consumption system;

generating, on a computing device, a query that identifies the music track;

providing the query to a video distribution system, wherein the video distribution system is configured to receive and process the query; receiving a result set from the video distribution system;

when the result set defines one or more videos, available via the video distribution system, that are related to the music track that the user intends to share, generating a post from the user, on a social networking site, that includes at least one link locating at least one video selected from the one or more videos defined within the result set; and prompting the user to share a different music track when the result set received from the video distribution system defines zero videos.

14. The computing system of claim 13 further configured to perform operations comprising:

automatically selecting the at least one video from the one or more videos defined within the result set.

15. The computing system of claim 13 wherein generating a query that identifies the music track includes generating a query that identifies one or more of:

a track artist,
an album artist, and
a track title.

16. The computing system of claim 13 wherein providing the query to a video distribution system includes:

providing the query to an applications programming interface of the video distribution system.

17. The computing system of claim 13 wherein the post from the user further includes rich metadata associated with the music track defined within the music consumption system.

18. The computing system of claim 13 wherein the result set from the video distribution system defines metadata for each of the one or more videos defined within the result set.

* * * * *